May 18, 1965  R. B. SIMS  3,183,693
CONTROL SYSTEM FOR TEMPER ROLLING MILLS
Filed Nov. 29, 1960
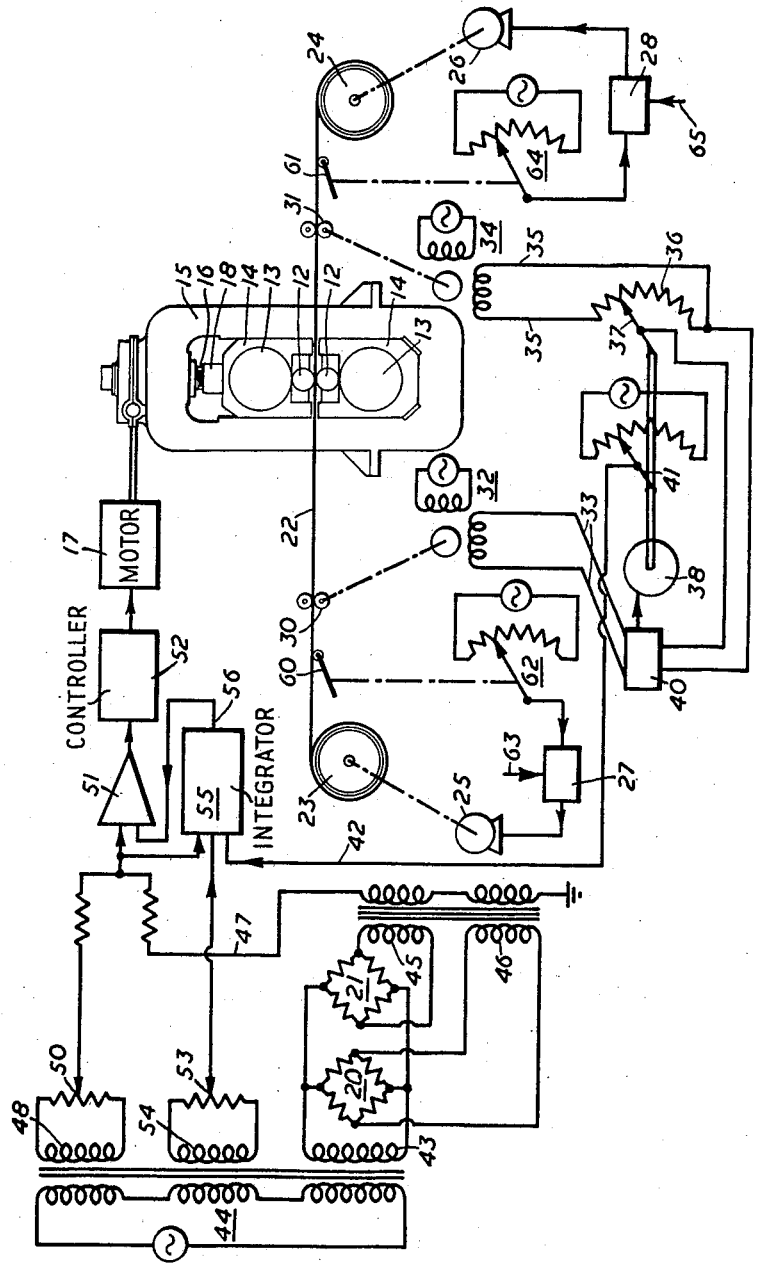
INVENTOR
RAYMOND B. SIMS
BY
*Henry C. Westin*
ATTORNEY

United States Patent Office 3,183,693
Patented May 18, 1965

3,183,693
CONTROL SYSTEM FOR TEMPER ROLLING MILLS
Raymond Bernard Sims, Sheffield, England, assignor to Davy and United Engineering Company Limited, Sheffield, England
Filed Nov. 29, 1960, Ser. No. 72,514
Claims priority, application Great Britain, Nov. 30, 1959, 40,574/59
2 Claims. (Cl. 72—19)

This invention relates to temper mills. Steel strip which has been heavily reduced in a cold rolling mill is very hard and is usually subsequently annealed to form mild steel strip. The mild steel strip is, however, too soft for fabricating, for example by pressing, and it is therefore given a tempering reduction in a temper mill. This tempering reduction increases the hardness of the strip and suppresses other undesirable properties, such as the double yield point encountered in pressing. The reduction in the temper mill is small compared with that of the initial cold rolling, and usually varies between ¼% and 6%.

It is important that the strip is uniformly hard along its length. Otherwise, the yield point of the steel varies and pressing operations become difficult. A constant percentage reduction or elongation of the strip in the temper mill results in constant hardness along the strip and it has been discovered that to a first order of approximation, a constant percentage reduction or elongation occurs when the load applied by the rolls is constant.

Accordingly, a control system for a temper rolling mill comprises means responsive to the rolling load in the mill and a control circuit controlled by the rolling load responsive means and controlling the rolling load to maintain that load at a substantially constant value.

In order to avoid the small changes in reduction which may occur when the rolling load is merely maintained at a constant value, it is preferred to employ in addition to the load responsive means a monitor having a long time constant compared with that of the load responsive means to measure the true percentage elongation or reduction of the strip passing through the mill and for applying a monitoring control over the mill to maintain the percentage reduction or elongation constant. Thus, in a preferred form of the invention, a control system for a temper rolling mill comprises means responsive to the load applied to the rolls, a monitor responsive to the percentage reduction or elongation of the strip passing through the mill, and means controlled jointly by the load responsive means and the monitor to maintain the percentage reduction or elongation substantially constant, the monitor responding to reduction or elongation changes of long term duration compared with the duration of load variations to which the load responsive means respond. Elongation may be measured in place of reduction of the strip, since, with wide strip where there is little lateral spread of the strip on reduction, the proportional elongation of the strip is equal to the proportional reduction.

The load responsive means act to control the mill to maintain the percentage reduction or elongation constant for short term variations in the thickness of the strip, and gives an error signal which is suitable for fast acting closed loop regulators, whereas the monitor corrects for long term deviations of the percentage reduction or elongation from the desired value. The long time period of the monitor ensures that the fast acting control system will not attempt to compensate for short term erroneous indications given by the monitor, which is a characteristic of all forms of absolutely accurate means of measuring reduction or elongation.

It has also been ascertained that, for satisfactory temper rolling, the tension of the strip being rolled should preferably be kept constant, as well as the reduction of the strip. Therefore, in accordance with a preferred form of the invention, a control system for a temper rolling mill comprises means responsive to the rolling load in the mill, a control circuit controlled by the rolling load responsive means and controlling the rolling load to maintain that load at a substantially constant value, and means for maintaining substantially constant the tension in the strip being rolled.

The invention will be more readily understood by way of example from the following description of a control system for a temper mill, reference being made to the accompanying diagrammatic drawing illustrating the mill and control system.

Referring to the drawing, the mill is represented by a pair of work rolls 12, a pair of back-up rolls 13, chocks 14 in which the back-up rolls 13 are located and a mill frame 15 in which the chocks 14 are slidably arranged. Two screws 16 driven by an electric screwdown motor 17 act on the upper chocks 14 at each end of the upper roll, load cells 18 being interposed between the bottom of the screws 16 and the tops of the upper chocks 14. Each load cell 18 is of known form, comprising a steel block having secured to it a set of strain gauges connected in the form of a resistance bridge. The strain gauges of the two load cells 18 are shown independently at 20, 21. The strip 22 is drawn off a reel 23 and between the work rolls 12 by a take-up reel 24. Reels 23, 24 are driven by electric motors 25, 26 respectively, and motors 25, 26 are controlled by speed control circuits 27, 28 respectively.

The mill is also supplied with a device for detecting the proportional elongation and hence the proportional reduction effected on the strip by the rolls 12. This device comprises two discs 30, 31 engaging against, and driven by, the strip 22 entering and leaving the rolls 12, respectively. Disc 30, at the entry side, drives a tachometer 32, which is energised by an A.C. source and which produces on lines 33 an A.C. voltage dependent on the speed of the strip at the entry side. Similarly, disc 31 drives a tachometer 34, which is similarly A.C. energised and emits a signal on lines 35 dependent on the strip speed at the exit side of the mill. Lines 35 are connected across an arcuate potentiometer 36, the wiper 37 of which is driven by an electric motor 38. The voltage appearing on slider 37 is fed back to an amplifier 40 in opposition to the voltage on lines 33 and the output from amplifier 40 controls the motor 38. The motor 38 drives the slider 37, until the voltage on slider 37 is equal and opposite to the voltage on lines 33. When this has occurred, the angular position of the shaft of motor 38 is proportional to the voltage on lines 33 divided by the voltage on lines 35, and is therefore proportional to the strip speed at the entry side of the mill divided by the strip speed at the exit side, or the elongation of the strip. This, in turn, is equal to the ratio of the strip thickness at the exit side to the strip thickness at the entry side, since the width of the strip is not altered appreciably in passing through the mill, and is therefore equal to the proportional reduction effected on the strip by the mill.

The shaft of motor 38 also drives the wiper 41 of a second potentiometer 42, which is energised by an A.C. source. The voltage of slider 41, which is proportional to the proportional reduction effected in the mill appears on line 42.

The two strain gauge bridges 20, 21 are connected in parallel across a winding 43 of a transformer 44 energised from the same A.C. source. The out-of-balance voltages from the bridges 20, 21 are applied to the primary windings 45, 46 of an output transformer, the secondary windings of which are connected in series to a line 47. Another secondary winding 48 of transformer 44 is connected across a manually adjustable potentiometer 50 and the voltage from potentiometer 50 is applied in opposition to that on line 47 to the input of an amplifier 51, which is preferably of the type illustrated at Figure 1.8 on page 14 of "Electronic Analog Computers" by Korn and Korn, published by Mc-Graw-Hill Book Company, 1952. The output of amplifier 51 is applied to a controller 52 for motor 17.

A further manually operated potentiometer 53 energised by a further winding 54 of transformer 44 is set according to the proportional elongation or reduction required of the mill and the signal from potentiometer 53 is applied in opposition to the signal on line 42 to the input of an integrating circuit 55, which is preferably of the type illustrated at Figure 1.14 on page 18 of the before-mentioned book "Electronic Analog Computers." The resultant of the signals on line 42 and from potentiometer 53 is also opposed in integrating circuit 55 by the voltage applied to the input of amplifier 51. The integrating circuit 55 has a time of response of the order of 4 seconds and the output voltage, appearing on line 56 is used as a monitor signal, being applied to a further input of the amplifier 51.

The strain gauge bridges 20, 21 of load cells 18 detect the mean rolling load in the mill. If the detected rolling load differs from that value set by operation of potentiometer 50, an error signal is applied to the amplifier 51 to operate the screw-down motor and to alter the setting of the rolls 12. The rolling load is therefore altered, until the input to amplifier 51 is substantially zero and the rolling load corresponds to the value set in the potentiometer 50. In this way, the rolling load is maintained substantially constant. However, it is conceivable that through thermal and other effects the rolling load datum may drift with time with the result that the signal from the strain gauges may not properly represent the actual rolling load and that the actual rolling load is not kept constant at the required value determined by potentiometer 50. Any such drift is corrected by the proportional reduction detector comprising the tachometers 32, 34. If there is any long term drift in the reduction effected by the mill, there is a difference between the rolling load error signal, as applied to the input of amplifier 51, and the reduction error, as detected by the difference between the signals on line 42 and from potentiometer 53. This difference in the error signals appears as an output on line 56 to bias the rolling load error signal applied to amplifier 51 and thus alter the value at which the rolling load indicated by the load cells is kept constant, so that constant proportional reduction is maintained. Minor irregularities in the output of the reduction detector, caused for example by failure of the strip 22 to drive the rollers 30, or 31, do not affect the control system, because of the relatively long response time of the integrating circuit 55.

While satisfactory temper rolling can be achieved simply by maintaining the proportional reduction at a constant value by the circuit described above, it has been found that further improvement is obtainable by simultaneously keeping the tension of the strip 22 constant. This is achieved by supplying a tension meter 60 at the entry side of the mill and a similar tension meter 61 at the exit side. Tension meter 60 controls a potentiometer 62, which is energised by an A.C. source and the voltage from which is applied to the speed controller 27 of reeling motor 25. In the controller 27, the voltage from potentiometer 62, which is dependent on the tension in the strip at the entry side, is compared with a datum signal on line 63 and the speed of the motor 25 is automatically controlled to keep the tension at the value set by the signal on line 63. Similarly, the exit tension meter 61 controls a further potentiometer 64 which, with a datum signal on line 65, controls the speed controller 28 of the reeling motor 26. As before, the system operates to keep the tension of the strip at the exit side of the mill at a constant value set by the signal on line 65.

While the motor has been described as having screws 16 and a screw-down motor 17 for adjusting the rolling load, it will be appreciated that in place thereof hydraulic rams acting on the chocks 14 may be supplied and, in that case, the controller 52 may control the supply of hydraulic fluid to the rams to control the rolling load. When using rams in place of screws, it is preferred to retain the load cells 18 interposed between the rams and the chocks 14; however, the load cells 18 may be dispensed with and instead the rolling load may be detected by measuring the pressure of the liquid in the rams.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A control system for a temper rolling mill for strip comprising:
   means for adjusting the roll separation,
   means responsive to the rolling load in the mill,
   control means controlling the adjusting means and controlled by the load-responsive means to maintain the rolling load substantially constant,
   means responsive to variations in the proportional elongation produced in the strip by the mill,
   monitor means controlled by the said means responsive to variations in the proportional elongation and giving a signal dependent on variations in the proportional elongation of long-term duration compared with the duration of variations in the rolling load, and
   means responsive to said signal for modifying the operation of said control means should the said signal indicate variation in the proportional reduction, to cause the proportional reduction to be maintained substantially constant.

2. A control system, according to claim 1, including means for maintaining substantially constant the tension of the strip being rolled.

References Cited by the Examiner

UNITED STATES PATENTS

| | | | |
|---|---|---|---|
| 1,744,016 | 1/30 | Steckel | 35—1 |
| 2,137,611 | 11/38 | Hetler | 80—56.2 |
| 2,168,777 | 8/39 | McCreary | 80—56.1 |
| 2,275,509 | 3/42 | Dahlstrom | 80—56.2 |
| 2,276,816 | 3/42 | Bagno | 80—56.2 |
| 2,430,410 | 11/47 | Pauls | 80—56.3 |
| 2,474,116 | 6/49 | Rendel | 80—56.1 |
| 2,485,285 | 10/49 | Harris | 80—56.2 |
| 2,519,818 | 8/50 | Blain | 80—56 |
| 2,680,978 | 6/54 | Hessenberg et al. | 80—56.1 |
| 2,726,541 | 12/55 | Sims | 80—56.1 |
| 2,972,268 | 2/61 | Wallace et al. | 80—56.2 |
| 3,022,688 | 2/62 | Sims | 80—56.2 |
| 3,062,078 | 11/62 | Hulls | 80—56.2 |

WILLIAM J. STEPHENSON, *Primary Examiner.*

WILLIAM W. DYER, Jr., CHARLES W. LANHAM,
*Examiners.*